United States Patent Office 3,822,311
Patented July 2, 1974

---

3,822,311
PROCESS FOR THE PRODUCTION OF 2,5-DICHLORO-3-NITRO-BENZOIC ACID
Karlfried Wedemeyer and Rudolf Helm, Cologne, and Dieter Pawellek, Leverkusen, Germany, assignors to Bayer Aktiengesellschaft, Leverkusen, Germany
No Drawing. Filed Mar. 8, 1973, Ser. No. 339,254
Claims priority, application Germany, Mar. 22, 1972, P 22 13 799.1
Int. Cl. C07c 79/46
U.S. Cl. 260—515 A     13 Claims

ABSTRACT OF THE DISCLOSURE 2,5-dichloro-3-nitro-benzoic acid is produced by reacting 5-chloro-3-nitro-salicylic acid with an excess of a chlorinating agent, preferably at the reflux temperature of the mixture, in the presence of a N,N-dialkylcarboxylic acid amide or a tertiary amine as a catalyst, and saponifying, under acid conditions, the acid chloride thereby produced, to yield the desired compound.

---

The present invention relates to a process for the production of 2,5-dichloro-3-nitro-benzoic acid. This compound possesses excellent herbicidal properties and, additionally, serves as the starting product for the manufacture of the important commercial herbicide 2,5-dichloro-3-amino-benzoic acid.

It is known that 2,5-dichloro-3-nitro-benzoic acid is obtained when nitrating 2,5-dichlorobenzoic acid produced in the chlorination of benzoyl chloride, after subsequent saponification (see U.S. Pat. No. 3,397,229); this method is illustrated by the following formula scheme:

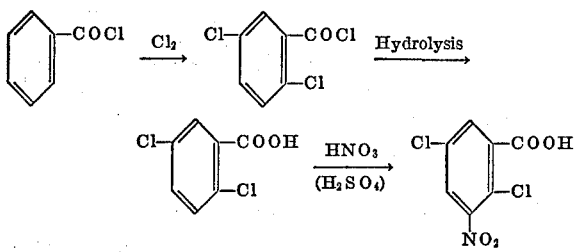

However, this method suffers from a number of disadvantages. For example, the 2,5-dichlorobenzoyl chloride required as an intermediate product is generally obtained on chlorinating benzoyl chloride, only as a crude product of 60–70% purity. Separation from the isomers and more highly chlorinated products simultaneously formed by fractional distillation is very difficult because of the corrosive properties of the mixture and because the boiling points of the by-products are close together. Similar problems arise in an isolation of 2,5-dichlorobenzoic acid from the corresponding acid mixture. If the crude 2,5-dichlorobenzoic acid is employed for the nitration, 2,5-dichloro-3-nitro-benzoic acid which is very heavily contaminated by phytotoxic by-products is obtained. Its use as a herbicide becomes impossible if the content of phytotoxic substances, especially the concentration of 2,5-dichloro-6-nitro-benzoic acid, exceeds a defined threshold value. The objectionable 2,5-dichloro-6-nitro-benzoic acid is also formed on nitration of pure 2,5-dichlorobenzoic acid. Since, for economic reasons, it is only possible to start from a very impure 2,5-dichlorobenzoic acid and since the subsequent nitration also takes place very non-uniformly, the yields of the desired 2,5-dichloro-3-nitro-benzoic acid are low and phytotoxic by-products are necessarily produced. While these can be removed by several methods (see U.S. Pat. Nos. 3,441,603, 3,417,137 and 3,174,999), for example by lengthy fractional recrystallization, the processes are either involved or lead to high losses.

A somewhat improved process for the manufacture of 2,5-dichloro-3-nitro-benzoic acid is described in German Offenlegungsschrift (German Published Specification) 2,126,210, but this process is also subject to the fundamental difficulties set further above.

The present invention provides a process for the production of 2,5-dichloro-3-nitro-benzoic acid in which 5-chloro-3-nitro-salicyclic acid is reacted with an excess of a chlorinating agent, preferably at the reflux temperature of the mixture, in the presence of a N,N-dialkylcarboxylic acid amide or of a tertiary amine as catalyst, optionally in a solvent, and the acid chloride thereby produced is saponified under acid conditions.

The process is illustrated by the following formula scheme:

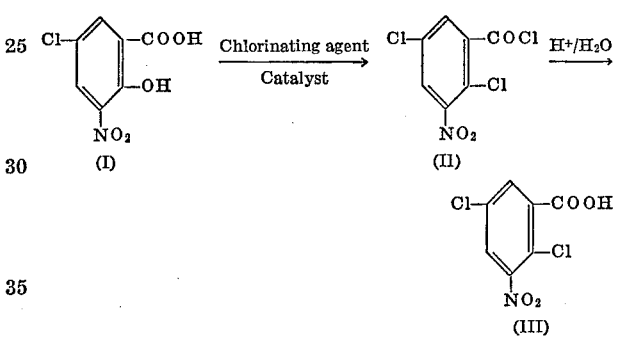

The process of the invention can be carried out as a "one-pot" process. The saponification may take place in a homogeneous phase, or in a two-phase system. The product can be obtained in high yield and excellent purity.

It is distinctly surprising that the reaction sequence according to the invention leads, with excellent selectivity, to 2,5-dichloro-3-nitro-benzoic acid because from what was previously known it was to be expected that firstly the smooth substitution of the hydroxyl group by chlorine in the 5-chloro-3-nitro-salicylic acid activated only by a nitro group would not be possible directly (compare J. Pharm. Soc. Japan 85, 544–546 (1965)) and that, secondly, a saponification of 2,5-dichloro-3-nitro-benzoyl chloride would only succeed satisfactorily in alkaline solution. In this, however, a partial reverse replacement of the Cl atom (previously introduced into the benzene ring) by an OH group would be unavoidable because of the slow saponification.

The process according to the invention shows several advantages. For example, 5-chloro-3-nitro-salicylic acid serves as a starting material which can be prepared in excellent purity, free of undesired isomers. The reactions carried out with it take place, according to the present possible "one-pot" process, without interfering side-reactions and yield, very selectively, a substance which is a single chemical compound. It is worthy of emphasis that in the present process 2,5-dichloro-3-nitro-benzoic acid is immediately obtained, after simple working up, practically completely free of phytotoxic by-products and in high yields.

If 5-chloro-3-nitro-salicylic acid and thionyl chloride are used as the starting substances, the course of the reaction can be represented by the following formula scheme:

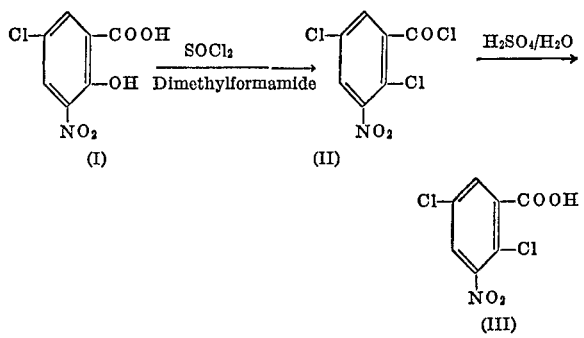

The starting material, 5-chloro-3-nitro salicylic acid, which is defined by formula (I), can be prepared according to a known process (see German Patent Specification 137,118).

The reaction according to the invention is appropriately carried out without an additional diluent. However, it is also possible to use a diluent. As such, inert organic solvents can be used. These include aromatic hydrocarbons, especially toluene.

Possible chlorinating agents include inorganic acid chlorides, preferably thionyl chloride and phosphorus oxychloride.

A N,N-dialkylcarboxylic acid amide or a tertiary amine is employed as catalyst. Preferred catalysts are N,N-dialkylcarboxylic acid amides in which the alkyl groups attached to the nitrogen atoms independently of each other contain from 1 to 4 carbon atoms and in which the carboxyl group contains from 1 to 4 carbon atoms. As examples there are mentioned in particular: N,N-dimethylformamide and N,N-dimethylacetic acid amide.

Other preferred catalysts are cyclic N-alkyl-substituted carboxylic acid amides containing from 4 to 6 ring carbon atoms and from 1 to 4 carbon atoms in the alkyl group which is attached to the nitrogen atom. As an example there may be mentioned N-methyl-pyrrolidone.

Preferred catalysts are also tertiary amines in which the nitrogen atom is substituted by an aryl group, such as phenyl, and two alkyl groups which independently contain from 1 to 4 carbon atoms. Specific examples of said tertiary amines are N,N-dimethyl-aniline and N,N-diethylaniline.

Other preferred catalysts are heteroaromatic nitrogen compounds such as pyridine.

The reaction temperatures can be varied but preferably the reaction is carried out at the reflux temperature of the particular mixture used.

The reaction according to the invention is preferably carried out under normal pressure.

Possible acids to be added during the saponification include strong organic and inorganic acids, especially sulfuric acid.

In carrying out the process according to the invention, one generally uses 2 to 7 mols of chlorinating agent and 0.1 to 4 mols (preferably 1 to 3 mols) of catalyst for each mol of 5-chloro-3-nitro-salicylic acid. The reaction mixture is generally boiled for 6 to 24 hours at its particular reflux temperature.

Working up may be effected by distilling off the chlorinating agent *in vacuo*, if appropriate taking up the residue in a water-miscible solvent and, if necessary after filtration, carring out the saponification with addition of water and acid, at the reflux temperature, in a homogeneous phase or, if appropriate, in a two-phase system. Thereafter, if necessary, the solvent may be striped off *in vacuo* and the residue may be treated with an aqueous base. If necessary organic solvent which is still present is separated off and the aqueous-alkaline solution is filtered and acidified. Thereupon the product generally separates out as a crystalline precipitate of high purity.

If desired, working up can also be effected by pouring the reaction mixture on to ice, filtering and dissolving the residue in a water-miscible organic solvent, and in other respects following the method described above.

In a particular embodiment it is also possible to use moist 5-chloro-3-nitro-salicylic acid for the reaction according to the invention. If necessary, the water present is distilled off azeotropically, before the halogenation reaction, by adding a suitable organic solvent.

The process according to the invention permits economical production of very pure 2,5-chloro-3-nitro-benzoic acid which is not contaminated by phytotoxic by-products and which is therefore very suitable for use as a herbicide (compare U.S. Patent Specification 3,013,873). A solution of an alkali metal salt of 2,5-chloro-3-nitro-benzoic acid can be used as the starting substance for the synthesis of the important herbicide 3-amino-2,5-dichloro-benzoic acid (U.S. Patent Specification 3,014,063).

When it is to be used as a herbicidal active compound, the 2,5-dichloro-3-nitro-benzoic acid prepared according to the present invention can be converted into the usual formulations, such as solutions, emulsions, suspensions, powders, pastes and granulates. These may be produced in known manner, for example by mixing the active compound with extenders, that is, liquid or solid or liquefied gaseous diluents or carriers, optionally with the use of surface-active agents, that is, emulsifying agents and/or dispersing agents, and/or foam-forming agents. In the case of the use of water as an extender, organic solvents can, for example, also be used as auxiliary solvents.

As liquid diluents or carriers, there are preferably used aromatic hydrocarbons, such as xylenes, toluene, benzene or alkyl naphthalenes, chlorinated aromatic or aliphatic hydrocarbons, such as chlorobenzenes, chloroethylenes or methylene chloride, aliphatic hydrocarbons, such as cyclohexane or paraffins, for example mineral oil fractions, alcohols, such as butanol or glycol as well as their ethers and esters, ketones, such as acetone, methyl ethyl ketone, methyl isobutyl ketone or cyclohexanone, or strongly polar solvents, such as dimethyl formamide, dimethyl sulfoxide or acetonitrile, as well as water.

By liquefied gaseous diluents or carriers are meant liquids which would be gaseous at normal temperatures and pressures, e.g. aerosol propellants, such as halogenated hydrocarbons, e.g. freon.

As solid diluents or carriers, there are preferably used ground natural minerals, such as kaolins, clays, talc, chalk, quartz, attapulgite, montmorillonite or diatomaceous earth, or ground synthetic minerals, such as highly-dispersed silicic, alumina or silicates.

Preferred examples of emulsifying and foam-forming agents include non-ionic and anionic emulsifiers, such as polyoxyethylene-fatty acid esters, polyoxyethylene-fatty alcohol ethers, for example alkylarylpolyglycol ethers, alkyl sulfonates, alkyl sulfates and aryl sulfonates as well as albumin hydrolyzation products; and preferred examples of dispersing agents include lignin, sulfite waste liquors and methyl cellulose.

The invention therefore provides a herbicidal composition containing as active ingredient the compound prepared according to the invention in admixture with a solid or liquefied gaseous diluent or carrier or in admixture with a liquid diluent or carrier containing a surface-active agent. The composition may for example contain 0.1 to 95% by weight of the compound.

The invention also provides a method of combating weeds which comprises applying to the weeds or their habitat the compound prepared according to the invention along or in the form of a composition containing as active ingredient the compound prepared according to the invention in admixture with a diluent or carrier. The invention also provides methods of obtaining crops protected from damage by weeks by being grown in areas in which, immediately prior to and/or during the time of the growing, the compound prepared according to the invention was applied alone or in admixture with a diluent or carrier. It will be seen that the usual methods of providing a harvested crop may be improved by the present invention.

The invention is illustrated, but not limited by the following Examples.

Example 1

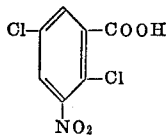

96 g. of 5-chloro-3-nitro-salicylic acid (0.44 mol), with 450 ml. of thionyl chloride and 36 ml. of dimethylformamide (DMF) (0.47 mol) were heated under reflux for 24 hours. Thereafter the thionyl chloride was distilled off *in vacuo*. The residue was taken up in 500 ml. of acetone, the mixture was filtered, 150 ml. of water and 6 ml. of concentrated sulfuric acid were added and the whole was heated under reflux for 15 hours. The solvent was stripped off *in vacuo*, the residue was dissolved in aqueous sodium hydroxide solution, the solution was filtered and the 2,5-dichloro-3-nitro-benzoic acid was precipitated by acidification. After filtration, washing and drying, an acid of melting point 214–216° C., whcih was pure according to thin layer chromatography, was obtained in 87% yield.

Example 2

103 g. of moist 5-chloro-3-nitro-salicylic acid (from the nitration batch of the 5-chloro-salicylic acid) were distilled azeotropically with 400 ml. of toluene, whereupon 8 ml. of water were removed while distilling off 200 ml. of toluene. The paste which was left as the residue was treated with 450 ml. of thionyl chloride and 36 ml. of DMF (0.47 mol) and the mixture was heated under reflux for 24 hours. Thereafter the thionyl chloride was distilled off through a 40 cm. Raschig column at 45–65° C./250 mm. The residue was treated with 150 ml. of water and 6 ml. of concentrated sulfuric acid and the mixture was boiled for 15 hours under reflux while stirring. Thereafter the mixture was vigorously stirred with 30 g. of sodium hydroxide solution in 3 liters of water and allowed to settle out, and the toluene phase was separated off. The aqueous-alkaline phase was filtered and acidified. After filtering off, washing and drying, 2,5-dichloro-3-nitro-benzoic acid, which was pure according to thin layer chromatography, was obtained in 79% yield and with a melting point of 212–214° C.

Example 3

The reaction was carried out as described in Example 2 but in addition to the thionyl chloride the toluene was also distilled off and saponification was carried out as in Example 1, in acetone solution. After reprecipitation, a 2,5-dichloro-3-nitro-benzoic acid of melting point 213–215° C. was obtained in 82% yield.

Example 4

101 g. of moist 5-chloro-3-nitro-salicylic acid from the nitration batch of 5-chloro-salicylic acid (water content: 6 g.) were reacted as in Example 1. A 2,5-dichloro-3-nitrobenzoic acid of melting point 214–216° C., which was pure according to thin layer chromatography, was obtained in 85% yield.

Example 5

21.7 g. of 5-chloro-3-nitro-salicylic acid (0.1 mol) were suspended in 200 ml. of phosphorus oxychloride (POCl$_3$). 50 ml. of N,N-diethylaniline (0.3 mol) were added dropwise while cooling, whereupon all the material dissolved. Thereafter the mixture was stirred for 6 hours at reflux temperature while excluding moisture and after cooling was poured onto 2 kg. of ice. The produce was filtered off, washed with water and dissolved in 100 ml. of acetone. 30 ml. of water and 1.2 g. of concentrated sulfuric acid were added and the mixture was boiled under reflux for 15 hours. The solvent was then stripped off *in vacuo*, the residue was dissolved in sodium hydroxide solution, the solution was filtered and the product was precipitated by acidification. After filtration, washing and drying, 16.5 g. (71%) of 2,5-dichloro-3-nitro-benzoic acid of melting point 216–218° C., which was pure according to thin layer chromatography, were obtained.

It will be understood that the specification and examples are illustrative but not limitative of the present invention and that other embodiments within the spirit and scope of the invention will suggest themselves to those skilled in the art.

What is claimed is:

1. Process for the preparation of 2,5-dichloro-3-nitrobenzoic acid which process comprises reacting 5-chloro-3-nitro-salicylic acid with an excess of an inorganic acid chloride as a chlorinating agent, at elevated temperature in the presence of N,N-dialkylcarboxylic acid amide or a tertiary amine as a catalyst, saponifying the acid chloride thereby produced under acid conditions, and recovering the desired compound.

2. Process as claimed in claim 1 wherein the reaction between said 5-chloro-3-nitro-salicylic acid and said chlorinating agent is carried out at the reflux temperature of the reaction mixture.

3. Process as claimed in claim 1 wherein the reaction between the said 5-chloro-3-nitro-salicylic acid and said chlorinating agent is carried out in the presence of a solvent.

4. Process as claimed in claim 3 wherein the solvent is toluene.

5. Process as claimed in claim 1 wherein the chlorinating agent is thionyl chloride.

6. Process as claimed in claim 5 wherein said elevated temperature is the reflux temperature of the reaction.

7. Process as claimed in claim 1 wherein said chlorinating agent is phosphorus oxychloride.

8. Process as claimed in claim 1 in which the said catalyst is dimethylformamide.

9. Process as claimed in claim 1 wherein said catalyst is N,N-diethylaniline.

10. Process as claimed in claim 1 in which there are used from 2 to 7 mols of said chlorinating agent and from 0.1 to 4 mols of said catalyst per mol of 5-chloro-3-nitro-salicylic acid reactant.

11. Process as claimed in claim 10 wherein from 1 to 3 mols of said catalyst are used per mol of 5-chloro-3-nitro-salicylic acid.

12. Process as claimed in claim 1 wherein said saponification is effected in the presence of sulfuric acid.

13. Process as claimed in claim 7 wherein said elevated temperature is the reflux temperature of the reaction.

References Cited

UNITED STATES PATENTS 3,703,546    11/1972   Leaper et al. _____ 260—518 A

FOREIGN PATENTS 89,596    11/1896   Germany _____ 260—544 M
20,359    9/1913    Great Britain ____ 260—544 M
193,399   11/1957   Austria _____ 260—544 M JAMES A. PATTEN, Primary Examiner U.S. Cl. X.R.

260—544